Aug. 10, 1948. W. A. SHEARER 2,446,887
TROLLEY YOKE STRUCTURE
Filed June 19, 1944
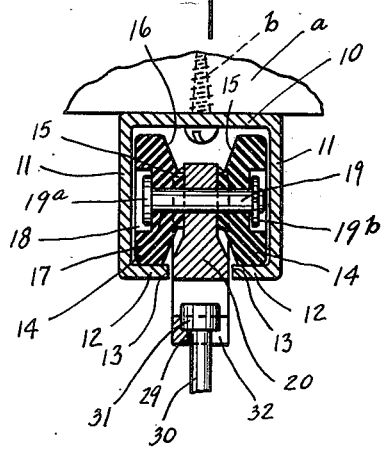
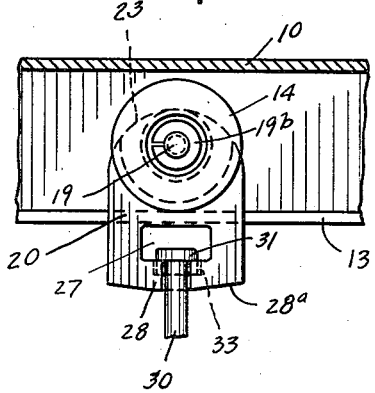
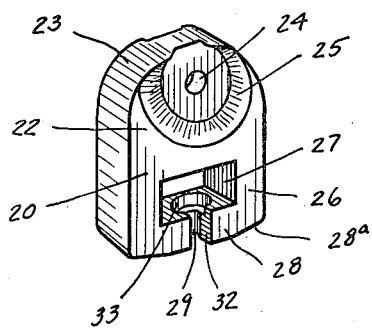
INVENTOR.
WILLIAM A. SHEARER.
BY
Lockwood, Goldsmith Galt.
ATTORNEYS.

Patented Aug. 10, 1948

2,446,887

UNITED STATES PATENT OFFICE 2,446,887

TROLLEY YOKE STRUCTURE

William A. Shearer, New Castle, Ind., assignor to New Castle Products, a copartnership composed of Henry D. Oberdorfer and Julia S. Oberdorfer, New Castle, Ind.

Application June 19, 1944, Serial No. 541,076

4 Claims. (Cl. 16—97)

This invention relates to a trolley and track structure such as utilized in foldable closures and for other purposes such as conveying systems employed in packing plants, automotive fabricating plants and like installations.

The chief object of the present invention is to provide a trolley structure which has certain advantages which will be pointed out more fully hereinafter and which in the foldable closure art can be used with so-called concealed tracks as well as exposed tracks.

The chief feature of the present invention resides in the specific construction of the connecting member and the trolley wheels associated therewith.

Other objects and features of the invention will be set forth more fully hereinafter.

The full nature of the invention will be understood from the accompanying drawings and the following description and claims:

In the drawings:

Fig. 1 is a transverse sectional view through a trolley structure and a support for the track, the latter being shown in elevation and together with a headed rod supported by said connecting member.

Fig. 2 is a longitudinal central sectional view through the track and with the wheels, connecting member and rod shown in elevation.

Fig. 3 is a perspective view of the connecting member and the preferred form thereof.

In the drawings a indicates a suitable support for a supporting trackway secured thereto as by screw b or the like extending through the top 10 of the track. Said track includes the parallel sides 11 and the inwardly directed flanges 12 forming the wheel bearing surfaces. These flanges have free edges 13 which are spaced apart to form an open slot or groove.

Rollable upon each flange portion is a wheel 14 having inwardly directed hub forming extension 15 and the inside face of each wheel between the hub and the tread is flared or tapered outwardly as at 16, this forming in effect a groove between the two wheels which can readily clear the anchoring means b as shown in Fig. 1. Each wheel includes a central aperture 17 which is counterbored at 18 in its outer face. An axle 19 includes wheel retaining means 19a and 19b at opposite ends, the same being seatable in this counterboring and the axle being seatable in the apertures 17.

It will be observed that the length of the hub portion is approximately that of the width of the tread portion, and yet the inside face of the hub portion is positioned inwardly of the adjacent free edge 13 of the supporting flange. The connecting member herein is shown as of a length approximately that of the wheel diameter, and this connecting member 20 at least in the slot receivable portion thereof is in width slightly less than the width of the slot. As a result, the connecting member just clears or freely rides in the slot and cocking and binding is prevented.

It will be observed also that the outside faces of the wheel just clear the inside faces of the adjacent sides 11 of the track so that since the wheels may be of composition and the track and connecting member of metal, side face wheel wearing and binding is substantially eliminated. This construction also prevents the formation of flat portions in the wheels. This construction also is capable of use in what may be termed concealed or the exposed type of tracks employed in foldable closure constructions and the like.

The connecting member 20, see Fig. 3, has an upwardly projecting portion 22. This has a rounded upper surface as at 23, and extending through the portion 22 is the axle receiving aperture 24. This upper portion adjacent the aperture 24 is counterbored as at 25 to receive the confronting inwardly directed hub portions 15 of the adjacent wheels.

The lower track projecting portion 26 of the connecting member includes an aperture 27 therethrough parallel to the axle aperture 24. Extending from the lower face 28 of the lower projecting portion and communicating with the aperture 27 at its upper end is the transverse aperture 29. A rod or the like 30 having suitable retaining means 31, which may be a pair of lock nuts or the like, is mounted in the aperture 29 and the nuts are exposed in the aperture 27 for rod connection.

The preferred form of the invention, however, includes a slot 32 of a width equal to the diameter of the aperture 29. When this slot is provided, the communicating end of the aperture 29 is counterbored as at 33 to receive the retaining means on the end of the rod 30. When this type of construction is employed, the rod 30 may have its retaining means comprise an integral head or an enlargement which is seatable in the counterbore 33.

Mounting of the rod is effected as follows:

The rod, in slightly elevated relation, is presented to the slot 32 and passed inwardly into the aperture 29, the enlargement 31 being of less height than the height of the aperture 27.

When the rod, seated in the aperture 29, is lowered the head 31 on said rod seats in said counterbore. Thus the rod is connected to the connecting member. Preferably the lower face 28 is slightly relieved or chamfered as at 28a.

While the axle 19 and the wheel retaining means 19a and 19b are illustrated as an axle with a head 19a and a detachable retainer 19b, the construction may be unitary and comprise an axle which is mechanically headed at opposite ends in lieu of the construction illustrated.

The advantages of the present invention have been suggested in the connection with the detailed description, and it will be observed that the trolley structure cannot rock sidewardly in the slot and cannot rock horizontally about a vertical axis through the axle and the slot in the track, and thus wear on the wheels is prevented, and turning and twisting or binding of the trolley is also prevented.

The present invention in its preferred form provides a method of connecting the suspended rods from the connecting member in a very rapid manner.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A trolley and yoke structure including in combination a pair of confronting spaced wheels, an intermediate yoke member, an axle extending through said member and wheels and terminating inwardly of the outer remote faces of the wheels, the latter having an external counterbore, and means on the counterbore exposed ends of the axle for assembly retention purposes, the wheels on their confronting faces having inwardly directed coaxial extensions of a diameter appreciably less than the diameter of the wheel, opposite faces of the yoke member including extension nesting counterbores, the length of axle-wheel and extension bearing being approximately equal to wheel tread width.

2. A yoke structure as defined by claim 1 wherein the member counterbores are tapered inwardly.

3. A yoke structure as defined by claim 1 wherein the member counterbores are tapered inwardly, the member being of substantially uniform thickness, of a greater width and a still greater length, the axle connection thereto being disposed near one end, which is curved, the member counterbore inner taper circle being substantially tangential to the central portion of the curved end.

4. A yoke structure as defined by claim 1 wherein the member is elongated, the axle connection thereto being disposed near one end, the member having an opening therethrough adjacent the opposite end and parallel to the axle.

WILLIAM A. SHEARER.

REFERENCES CITED

The following references are of record in the file of this patent:

UNITED STATES PATENTS

| Number | Name | Date |
|---|---|---|
| 210,485 | Arnold | Dec. 3, 1878 |
| 1,067,725 | Flugger | July 15, 1913 |
| 1,382,365 | Kern | June 21, 1921 |
| 1,832,050 | Pitcher | Nov. 17, 1931 |
| 1,832,203 | Gussack | Nov. 17, 1931 |
| 1,863,233 | Hungerford | July 19, 1932 |
| 2,234,481 | Shafer | Mar. 11, 1941 |
| 2,322,529 | Long | June 22, 1943 |